(12) United States Patent
Lundmark

(10) Patent No.: US 7,900,941 B2
(45) Date of Patent: Mar. 8, 2011

(54) ANTI-ROLL BAR FOR MOTOR VEHICLES

(75) Inventor: Andreas Lundmark, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 336 days.

(21) Appl. No.: 12/095,603

(22) PCT Filed: Nov. 15, 2006

(86) PCT No.: PCT/EP2006/010939
§ 371 (c)(1),
(2), (4) Date: May 30, 2008

(87) PCT Pub. No.: WO2007/062744
PCT Pub. Date: Jun. 7, 2007

(65) Prior Publication Data
US 2010/0219599 A1   Sep. 2, 2010

(30) Foreign Application Priority Data
Dec. 1, 2005 (SE) ...................................... 0502653

(51) Int. Cl.
*B60G 21/055* (2006.01)
(52) U.S. Cl. ...................... 280/124.106; 267/25; 267/32; 267/260; 280/124.107; 280/124.116; 280/124.128
(58) Field of Classification Search ........... 280/124.106, 280/124.107, 124.116, 124.128, 124.153, 280/124.157, 124.162, 124.163, 124.165, 280/124.166, 124.17, 124.13, 124.131; 267/25, 267/31, 32, 260, 263
See application file for complete search history.

(56) References Cited

U.S. PATENT DOCUMENTS

| 2,753,007 A | | 7/1956 | Read | |
|---|---|---|---|---|
| 4,397,478 A | * | 8/1983 | Jensen et al. | 280/6.159 |
| 5,046,752 A | * | 9/1991 | Stephens et al. | 280/678 |

(Continued)

FOREIGN PATENT DOCUMENTS
FR       2529838 A1    1/1984
(Continued)

OTHER PUBLICATIONS

International Search Report from corresponding International Application No. PCT/EP2006/010939.

*Primary Examiner* — Paul N Dickson
*Assistant Examiner* — James English
(74) *Attorney, Agent, or Firm* — WRB-IP LLP

(57) ABSTRACT

A suspension system for providing a suspension between wheels and a frame of a vehicle is provided. The system includes an arm beam pivotally mounted to the frame at its proximate end and coupled at its distal end to a guiding assembly enabling the arm beam to pivot in a vertical direction and to be restrained in lateral directions perpendicular to the vertical direction. The arm beam includes: (a) a spring and damper assembly near its distal end for providing a dampened resilient mount for the suspension; (b) a wheel axle beam coupled to the arm beam for bearing a load borne by the wheels transmitted directly in-line with a central axis of the spring and damper assembly; and (c) a stabilizer coupled between the arm beam and the frame, the stabilizer resisting a lateral rolling motion of the vehicle. The stabilizer is included between the proximate end of the arm beams and their damper and spring assemblies for rendering the system more compact.

10 Claims, 4 Drawing Sheets

U.S. PATENT DOCUMENTS

| | | | | |
|---|---|---|---|---|
| 5,678,845 A | * | 10/1997 | Stuart | 280/124.116 |
| 6,086,077 A | * | 7/2000 | Stuart | 280/124.116 |
| 6,234,502 B1 | * | 5/2001 | Sobina | 280/124.163 |
| 6,286,857 B1 | * | 9/2001 | Reese et al. | 280/683 |
| 6,454,283 B1 | * | 9/2002 | Fenton | 280/124.163 |
| 6,607,205 B2 | * | 8/2003 | Platner | 280/124.116 |
| 6,808,192 B1 | * | 10/2004 | Bol | 280/124.116 |
| 6,834,873 B1 | * | 12/2004 | Vander Kooi et al. | 280/124.107 |
| 7,445,220 B2 | * | 11/2008 | von Mayenburg et al. | 280/124.116 |
| 7,520,515 B2 | * | 4/2009 | Richardson | 280/124.116 |
| 7,540,513 B2 | * | 6/2009 | Reineck | 280/124.106 |
| 2004/0145097 A1 | * | 7/2004 | Renaudot | 267/31 |
| 2007/0013160 A1 | * | 1/2007 | Richardson | 280/124.116 |
| 2007/0069495 A1 | * | 3/2007 | Middlebrook et al. | 280/124.116 |

FOREIGN PATENT DOCUMENTS

| | | |
|---|---|---|
| FR | 2827814 A1 | 1/2003 |
| WO | 0076795 A | 12/2000 |

* cited by examiner

ANTI-ROLL BAR FOR MOTOR VEHICLES

BACKGROUND AND SUMMARY

The present invention relates to suspension systems for road vehicles, for example for air suspension systems adapted for heavy vehicles such as trucks and buses. Moreover, the invention also relates to methods of providing suspension for such road vehicles.

Contemporary road vehicles are provided with suspension systems functionally included between wheels and chassis thereof. These suspension systems are operable to accommodate and dampen vertical movement of the wheels when such vehicles are in motion, such movement arising in response to, for example, uneven road surfaces. Thus, the suspension systems are adapted to reduce a magnitude of mechanical shocks being transmitted via the suspension systems to the chassis. Moreover, such suspension systems are necessary to enhance comfort of persons travelling in the vehicles, and also to reduce damage to objects, for example goods, being transported in the vehicles. Furthermore, accommodation and dampening of vertical motion is especially important in commercial road vehicles, for example in trucks operable to transport relative large quantities of fragile goods. Commercial road vehicles are often heavy, for example weighing several tonnes, and are capable of transporting goods of comparable weight. Moreover, such weights require suspensions systems of considerable strength to provide efficient shock absorbing functionality, such strength requirements conventionally requiring the suspension systems to add to vehicle height and compromising designs of such vehicles.

In order to be more effective, suspension systems need to be operable to provide for degrees of freedom of motion in certain direction and yet be stiff in other directions of motion, for example to prevent associated road vehicles having a tendency to roll which can be potentially dangerous, especially when the road vehicles are required to bear their loads at relatively elevated height. It is a considerable technical challenge to provide enhanced suspension systems in road vehicles in which severe height and compactness constraints are imposed of designers of such road vehicles.

In a published U.S. Pat. No. 6,209,895, there is described an axle suspension system for a wheeled road vehicle. The suspension system includes at each side of the vehicle a trailing arm beam pivotally connected at a proximate end thereof via a resilient pivotal bushing to a hanger of a chassis of the vehicle. An air spring is mounted substantially at a distal end of the trailing arm beam between the trailing arm beam and the vehicle chassis. A transversely extending vehicle axle is mounted substantially to the distal ends of the trailing arm beams via "U"-shaped bolts and a bushing held by nuts in a conventional manner. A shock absorber is mounted between the vehicle chassis and the trailing arm beam.

The suspension system also includes connections between the vehicle axle and the trailing arm beams to reduce stress concentrations spatially where the trailing arm beams are connected to the vehicle axle. Such stresses are reduced by employing a special form of axle cradle which extends laterally beyond sides of each trailing arm beam. To further dissipate stresses, sponsons are attached to each trailing arm beam on opposite sides thereof to provide additional support to the axle cradle and thereby dissipate the stresses being transmitted in operation from the axle cradle over a greater expanse of the trailing arm beams.

In a published European patent no. EP 0 940 321, there is described a suspension system for a heavy duty vehicle. The system comprises suspension units, wherein each suspension unit includes a spring and a telescopic damper fitted between a chassis of the vehicle and a beam axle thereof. Ends of the beam axle are braced on the chassis by trailing arms which are linked to the chassis via mounting blocks. The suspension system further comprises a transverse stabilizer connected at a first end thereof to a bottom end of a suspension bracket, and at a second end thereof to the beam axle. The stabilizer is implemented in a manner akin to a contemporary Panhard rod for resisting a lateral rolling motion of the vehicle.

Convention suspension systems, for example the systems described in the aforesaid U.S. Pat. No. 6,209,895 and also the European patent no. EP 0 940 321, suffer certain drawbacks which the present invention seeks to address. For example, the conventional systems are often insufficiently compact which compromises vehicle design, for example regarding beneficial location of wheel axles so as to better dynamically bear loads of associated vehicles. Moreover, the systems do not include their air springs located in most favourable positions. Furthermore, the conventional systems do not provide desirably resilient roll characteristics which are important to optimize to prevent vehicles swaying can result in vehicles swaying when corning which can potentially affect vehicle dynamic handling characteristics.

Thus, contemporary suspension systems are constrained in how their various suspension elements can be spatially disposed and mounted and in what combination they can be configured. Such constraints can potentially provide in operation non-optimal suspension characteristics.

It is desirable to provide an improved suspension system which is operable to address aforementioned limitations encountered with contemporary suspension systems, for example to enable suspension components to be included in such a manner so as to provide for more flexible design and a decrease in height build up of a vehicle.

According to a first aspect of the present invention, there is provided a suspension system operable to provide a suspension between wheels and a frame of a vehicle, said system comprising one or more arm beams, each arm beam being substantially pivotally mounted to the frame at its proximate end and coupled substantially at its distal end to a guiding assembly operable to enable the arm beam to pivot in substantially a vertical direction and to be substantially restrained in lateral directions substantially perpendicular to said vertical direction, wherein each arm beam further includes:

(a) a spring and damper assembly near or at its distal end for providing a dampened resilient mount for said suspension;

(b) a wheel axle beam coupled to the said one or more arm beams so that in operation a load borne by the wheels of the vehicle is transmitted directly substantially in-line with a central axis of said spring and damper assembly; and (c) a stabilizing arrangement coupled between the arm beam and the frame, the stabilizing arrangement being operable to at least partially resist a lateral rolling motion of said vehicle by way of torsional compliance exhibited by the stabilizing arrangement, said suspension system being configured so that said stabilizing arrangement is included between the proximate end of the one or more arm beams and their damper and spring assemblies for rendering the suspension system more compact.

The present invention is of advantage in that capable of providing a more compact and improved suspension system for vehicles.

Optionally, in the suspension system, the stabilizing arrangement includes a stabilizing member mounted in respect of said wheel axle beam via a plurality of bushing components, said plurality of bushing components enabling at least limited rotation of said stabilizing member relative to said wheel axle beam, said stabilizing member being provided with substantially mutually parallel orthogonal end portions adapted to be anchored in respect of said frame via pivotally-mounted linking members, said orthogonal end portions being deployed in operation substantially parallel to said one or more arm beams.

Optionally, in the suspension system, the spring and damper assembly includes at least one of: an air spring, a feather spring, a coil spring.

Optionally, in the suspension system, the guiding assembly comprises pivotally mounted first and second interfacing members substantially pivotally coupled via a pivoting region to said distal end of each arm beam.

Optionally, in the suspension system, the first interfacing member is coupled between the distal end of its associated arm beam and a first pivot, and the second interfacing member is coupled between said first pivot and a second pivot said second pivot being mounted in respect of said frame.

Optionally, in the suspension system, the one or more beam arms are implemented in operation as trailing beam arms.

Optionally, the suspension system is adapted for a front wheel set of the vehicle.

Optionally, alternatively, the suspension system is adapted for a rear wheel set of said vehicle.

According to a second aspect of the invention, there is provided a vehicle comprising a suspension system; the suspension system is implemented according to the first aspect of the invention.

It will be appreciated that features of the invention are susceptible to being combined in any combination without departing from the scope of the invention as defined by the accompanying claim set.

BRIEF DESCRIPTION OF THE DRAWINGS

Embodiments of the invention will now be described, by way of example only, with reference to the following drawings wherein:

FIG. 2b is a cross-sectional view of a part of the view presented in FIG. 2a;

DETAILED DESCRIPTION

Figure 1:
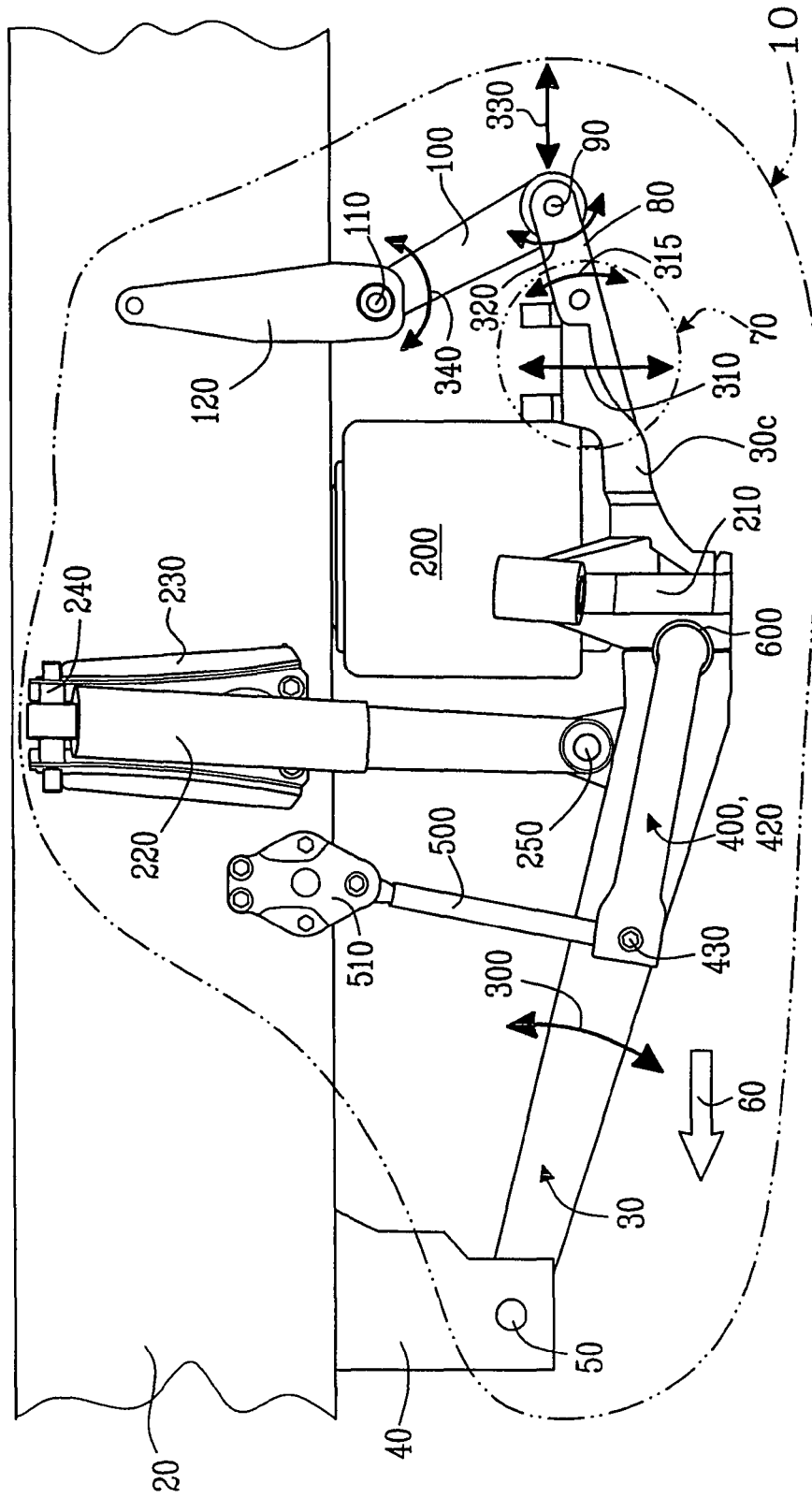
FIG. 1 is a schematic side view of an embodiment of a suspension system according to the present invention.

Referring to FIG. 1, there is shown a suspension system indicated generally by 10. The suspension system 10 is operable to provide a suspension function for a road vehicle (not shown), for example a heavy truck or similar goods vehicle. A portion of a chassis frame of the road vehicle is denoted by 20. The suspension system 10 includes a trailing arm beam 30 pivotally coupled at its proximate end via a pivot 50 to a frame bracket 40 mounted onto or integral with the frame 20. For reference, a normal forward direction of travel of the vehicle in operation is denoted by an arrow 60. The trailing arm beam 30 is included at both sides of the vehicle, namely the vehicle is provide with two such beams 30 on its left- and right-hand sides thereof.

The trailing arm beam 30 is elongate with its longitudinal axis substantially horizontal in operation, and optionally slightly inclined by circa 10 degrees relative to horizontal in operation as illustrated. Moreover, the trailing arm beam 30 is pivotally coupled via a pivotal region 70 at its distal end to a first end of a first interface member 80; the pivotal region 70 can be implemented using one or more pivots, or by employing suitably loosely abutting components. The first interface member 80 is elongate and also mounted so that its longitudinal axis is substantially horizontal in operation, and optionally slightly included by circa 10 degrees as illustrated; the first interface member 80 is shown inclined in an opposite manner relative to the trailing arm beam 30. A second end of the first interface member 80 is pivotally coupled via a pivot 90 to a first end of a second interface member 100. The second interface member 100 is also elongate and disposed in operation so that its longitudinal axis is substantially vertical; however, the second interface member 100 is beneficial shown slightly backwardly inclined by circa 10 to 15 degrees from vertical as illustrated. A second end of the second interface member 100 is pivotally coupled via a pivot 110 to mounting member 120 which is either integral to the frame 20 or firmly attached by welding, bolts or similar to the frame 20.

Towards the aforesaid distal end of the trailing beam arm 30, an air spring 200 is mounted between an upper surface of the trailing arm beam 30 and an underside surface of the frame 20; optionally, the air spring 200 can be mounted by way of bolts to an inside vertical surface of the frame 20. A central substantially vertical axis of the air spring 200 is substantially vertically in-line with a front wheel axle beam denoted by 210 from which wheel assemblies (not shown) are mounted. Such an arrangement is of advantage in that a load borne by the front axle beam 210 is transmitted directly and vertically upwardly symmetrically onto the air spring 200. Moreover, such an arrangement is not only compact but is an optimal manner in which to bear load in comparison to contemporary arrangements wherein wheel axles and corresponding air springs are laterally displaced and hence suboptimal in position. In the context of the present invention, it will be appreciated that the air spring 200 can be substituted with a leaf spring or coil spring if required.

The trailing arm beam 30 is further provided with a shock absorber 220 operable to provide damping. The shock absorber 220 is an elongate component mounted substantially vertically between: (a) a pivotal connection 250 attached to an upper surface of the trailing arm member 30; and (b) the frame 20 via a mounting member 230 and its associated mounting bar 240 attached to an exterior vertical side surface of the frame 20.

Operation of the suspension system 10 as so far described will now be elucidated. Movement of the wheels (not shown) attached to the front wheel axle beam 210 causes the trailing arm beam 30 to move pivotally as denoted by an arrow 300. The distal end of the trailing beam 30 moves upwardly and downwardly as denoted by an arrow 310. The first interface member 80 is operable to undergo a rocking movement about its pivoting region 70 and the pivot 90 as denoted by arrows 310, 315, 320 causing the pivot 90 to circumscribe a forward and backward motion as denoted by an arrow 330. Furthermore, the second interfacing member 100 is operable to undergo a pivoting motion about its pivot 110 as denoted by an arrow 340. The air spring 200 provides a resilient elastic force in respect of the trailing arm beam 30 and the damper 220 is operable to dampen motion of the trailing beam 30.

The interface members 80, 100 are of benefit in that they provide guiding support to the trailing arm beam 30 so as to reduce various lateral stresses that would otherwise be subjected to its pivot 50, the interface members 80, 100 thereby spreading stresses beneficially within the suspension system 10. Moreover, the suspension system 10 being implemented with the mounted member 120 disposed forwardly relative to the pivot 90 renders the suspension system 10 compact in a longitudinal axis of the vehicle.

However, the suspension system 10 includes further important parts which will now be described. The suspension system 10 further includes a stabilizer 400 of approximately "U"-shaped form and which is better illustrated in FIG. 3; in FIG. 3, the stabilizer 400 is a unitary component and comprises a transverse portion 410 mounted in operation between left and right sides of the vehicle and further comprises two end portions whose longitudinal axes are orientated perpendicularly to a longitudinal axis of the transverse portion 410 as illustrated. Moreover, the longitudinal axes of the portions 420 are mutually parallel. Distal ends of the portions 420 remote from the transverse portion 410 are provided with mounting holes 430 as illustrated. Referring again to FIG. 1, there is further included in the suspension system 10 on each side of the vehicle an elongate linking member 500 coupled between the hole 430 and a mounting member 510 attached to a side of the frame 20 as illustrated. The stabilizer 400 is operable to function in a manner akin to a Panhard rod to enable the wheel axle 210 to move in a vertical direction to accommodate movement of the wheels of the vehicle in response to unevenness in road surfaces but to resist rolling motion of the vehicle; the stabilizer 400 is also known as a reaction bar. However, in contradistinction to conventional implementations of Panhard rod, the stabilizer 400 is implemented symmetrically relative to a longitudinal axis of the vehicle. Moreover, the stabilizer 400 utilizes torsional compliance to allow for a limited degree of lateral movement of the vehicle in a rolling mode of motion, whereas a conventional Panhard rod utilizes axial compliance to provide such a limited degree of lateral movement in the rolling mode of motion. Such a difference is susceptible to providing the suspension system 10 with enhanced performance characteristics in comparison to conventional suspension systems.

Figure 3:
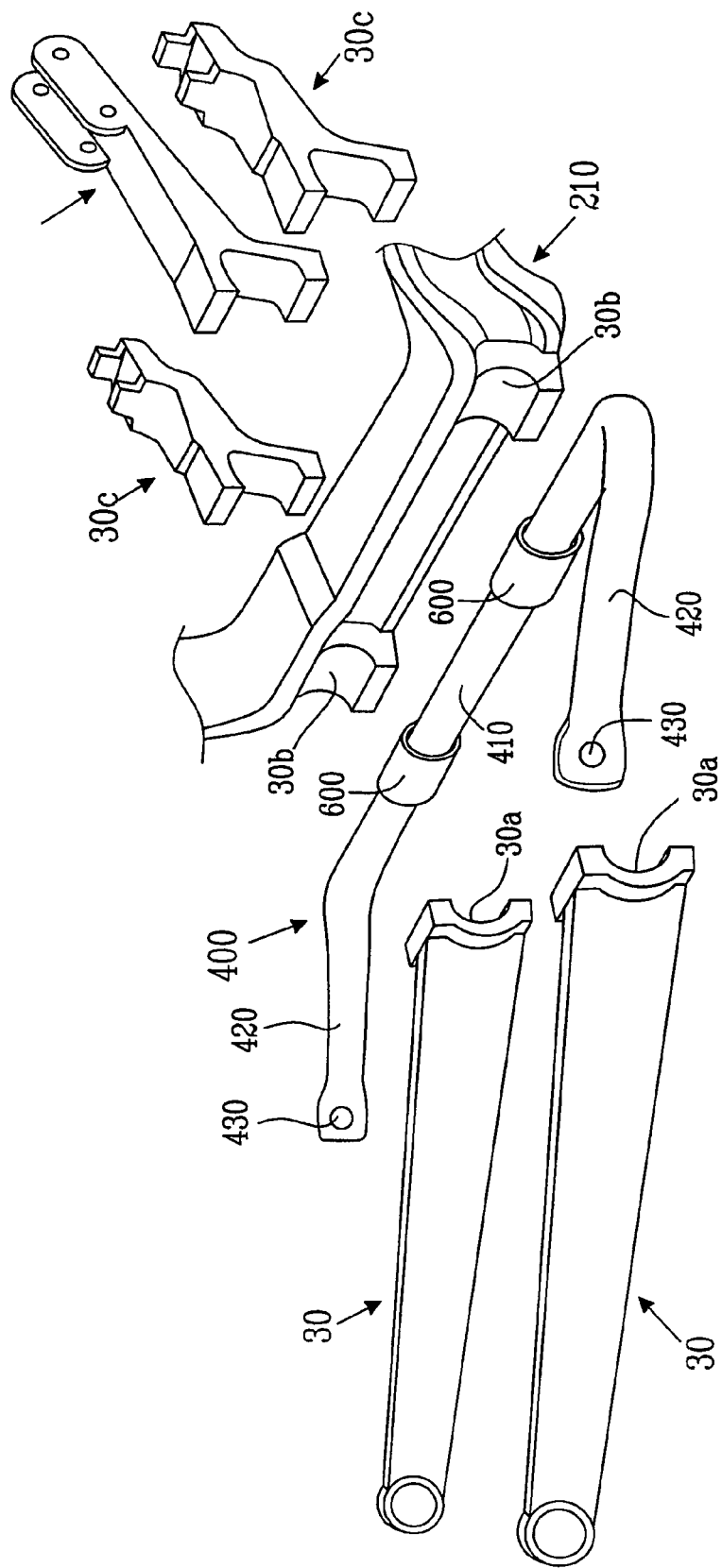
FIG. 3 is a schematic illustration of interrelationships of suspension components in embodiments of the present invention.
Figure 4:
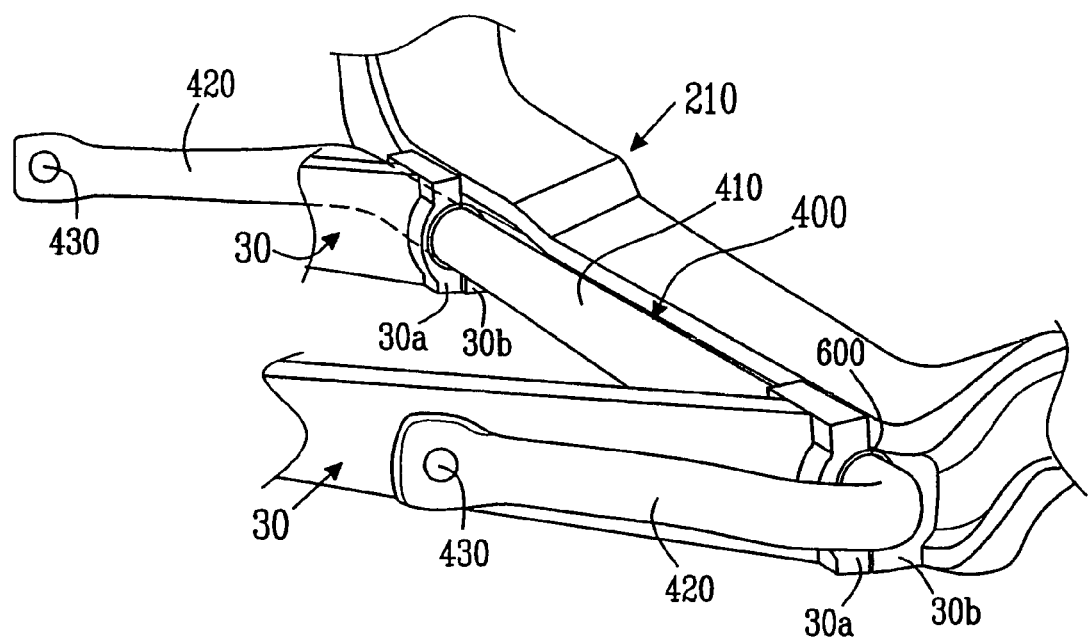
FIG. 4 is a schematic side view of another embodiment of the present invention.
Figure 5:
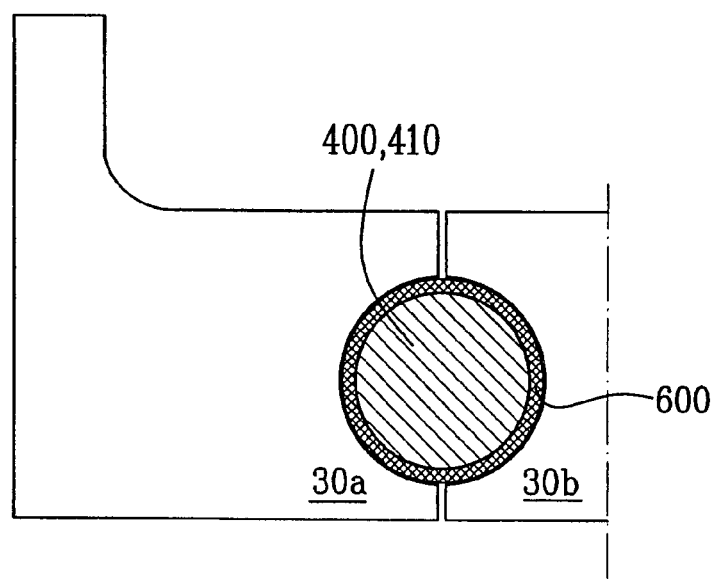
FIG. 5 is a perspective view of an embodiment of the present invention.

The trailing arm beam 30 is optionally implemented in two portions bolted or otherwise joined together as illustrated in FIGS. 3, 4 and 5 such as to provide abutting end portions denoted by 30a, 30b. The end portions 30a, 30b are provided with semicircular end faces which are sized to accommodate two bushing components 600 provided on the transverse portion 410 of the stabilizer 400. In operation, torsional movement of the transverse portion 410 is accommodated via the bushing components 600 relative to the trailing arm beam 30 in response to forces being coupled from the wheels to the front wheel axle beam 210.

Figure 2A:
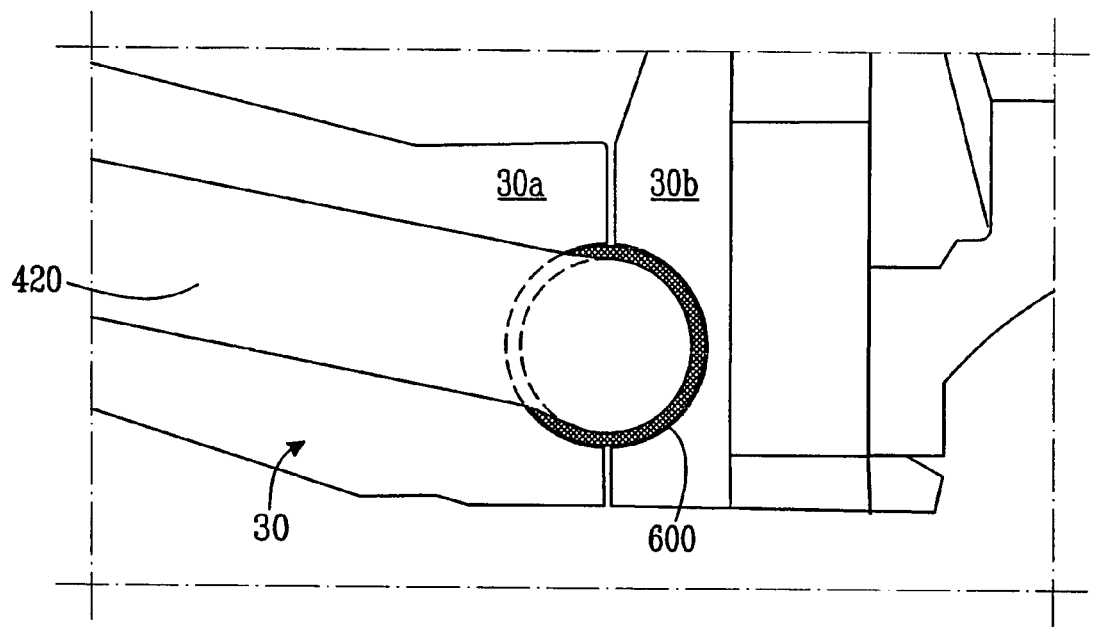
FIG. 2a is a schematic side view of a portion of the view present invention shown in FIG. 1.
Figure 2B:
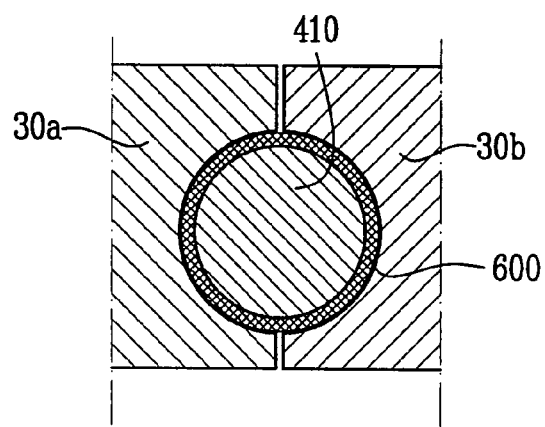

In FIG. 2a, the two end portions 30a, 30b of the trailing arm beam 30 are shown enlarged in side view. FIG. 2b is a cross-sectional view of the transverse portion 410 of the stabilizer 400 mounted concentrically in the bushing component 600 which in turn is held within the semi-circularly curved end faces of the end portions 30a1 30b of the trailing arm beam 30.

In FIG. 3, there is shown an exploded view of component parts of the suspension system 10 illustrating their manner of assembly together. An end portion of the trailing arm beam 30 whereat it is substantially pivotally joined to the aforesaid first interfacing member 80 is denoted by 30c. Referring to FIG. 4, there are illustrated component parts shown in FIG. 3 in corresponding mutually assembled state. FIG. 5 is a further illustration of the stabilizing bar 400 mounted in its bushing component 600 to the trailing arm beam 30; FIG. 5 is complementary to FIG. 2b.

In overview, the suspension system 10 provides considerable advantages in comparison to contemporary suspension systems, for example for trucks, buses and similar heavy vehicles. Theses advantages derive, for example, from following aspects:

(a) the stabilizer 400 is compactly incorporated alongside the front axle beam 210 and substantially parallel to the longitudinal axis of the trailing arm beam 30 to provide a compact but otherwise highly effective roll stabilization of the vehicle;

(b) a central axis of the air spring 200 substantially intersects with a transverse elongate axis of the front axle beam 210 so that a load from the wheels is directly transferred from the front axle beam 210 to the frame 20 in a most compact manner;

(c) the shock absorber 220 is conveniently included in front of the air spring 220 in an effective but otherwise compact arrangement;

(d) the interfacing members 80, 100 are effective in providing guiding support via the pivotal region 70 to the trailing arm beams 30 so as to reduce stresses that would otherwise have to be borne by the pivot 50; the member 120 is mounted forward of the pivot 90 to provide a compact disposition but nevertheless providing necessary degrees of freedom of movement.

By adopting the compact suspension system 10 as described in the foregoing, the spring 200 can be accommodated between the axle beam 210 and the frame 20. Optionally, the spring 200 is attached to the axle beam 210 onto sides of the axle beam 210 even though it is positioned between the axle beam 210 and the frame 20. The compact suspension system 10 also enables a more flexible placement of the axle beam 210 in the longitudinal direction of the vehicle; such placement is susceptible to reducing pressure on the axle beam 210. Incorporation of the suspension system 10 in a vehicle such as a truck or bus is also potentially susceptible to reducing an overall weight of the vehicle.

The suspension system 10 also is capable of providing the vehicle with increased ground clearance and also providing an increased control stroke, thereby potentially providing a safer and gentler suspension for the vehicle.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

The invention claimed is:

1. A suspension system operable to provide a suspension between wheels and a frame of a vehicle, the system comprising one or more arm beams, each arm beam being substantially pivotally mounted to the frame at a proximate end of the arm beam and coupled substantially at a distal end of the arm beam to a guiding assembly operable to enable the arm beam to pivot in substantially a vertical direction and to be substantially restrained in lateral directions substantially perpendicular to the vertical direction, wherein each arm beam further includes:
  (a) a spring and damper assembly near or at its distal end for providing a dampened resilient mount for the suspension;
  (b) a wheel axle beam coupled to the one or more arm beams so that in operation a load borne by the wheels of the vehicle is transmitted directly substantially in-line with a central axis of the spring and damper assembly; and
  (c) a stabilizing arrangement coupled between the arm beam and the frame, the stabilizing arrangement being operable to at least partially resist a lateral rolling motion of the vehicle by way of torsional compliance exhibited by the stabilizing arrangement, the suspension system being configured so that the stabilizing arrangement is included between the proximate end of the one or more arm beams and their damper and spring assemblies and so that a portion of the stabilizing arrangement generally perpendicular to the arm beam is disposed between the arm beam and the wheel axle beam.

2. A suspension system as claimed in claim 1, wherein the stabilizing arrangement includes a stabilizing member mounted in respect of the wheel axle beam via a plurality of bushing components, the plurality of bushing components enabling at least limited rotation of the stabilizing member relative to the wheel axle beam, the stabilizing member being provided with substantially mutually parallel orthogonal end portions adapted to be anchored in respect of the frame via pivotally-mounted linking members, the orthogonal end portions being deployed in operation substantially parallel to the one or more arm beams.

3. A suspension system as claimed in claim 1, wherein the spring and damper assembly includes at least one of: an air spring, a feather spring, a coil spring.

4. A suspension system as claimed in claim 1, wherein the guiding assembly comprises pivotally mounted first and second interfacing members substantially pivotally coupled via a pivoting region to the distal end of each arm beam.

5. A suspension system as claimed in claim 4, wherein the first interfacing member is coupled between the distal end of its associated arm beam and a first pivot, and the second interfacing member is coupled between the first pivot and a second pivot, the second pivot being mounted in respect of the frame.

6. A suspension system as claimed in claim 1 wherein the one or more beam arms are implemented in operation as trailing beam arms.

7. A suspension system as claimed in claim 1, the system being adapted for a front wheel set of the vehicle.

8. A suspension system as claimed in claim 1, the system being adapted for a rear wheel set of the vehicle.

9. A vehicle comprising a suspension system as claimed in claim 1.

10. A suspension system as claimed in claim 1, wherein the damper of the spring and damper assembly is disposed above the wheel axle beam.

* * * * *